(12) United States Patent
Genz et al.

(10) Patent No.: US 8,557,389 B2
(45) Date of Patent: Oct. 15, 2013

(54) USE OF A COMPOSITE MATERIAL BASED ON A ONE COMPONENT POLYURETHANE ADHESIVE

(75) Inventors: Manfred Genz, Ostercappeln (DE);
Hans-Ulrich Schmidt, Osnabrueck (DE); Timo Prozeske, Stemshorn (DE); Stefan Meyer, Cloppenburg (DE); Harald Roedel, Mutterstadt (DE); Norbert Strubel, Schifferstadt (DE); Johann Goertz, Beindersheim (DE); Frank Loewer, Hassloch (DE); Karl-Heinz Koch, Kapellen-Drusweiler (DE); Hasan Kuscu, Landau (DE)

(73) Assignee: BASF SE, Ludwigshafen (DE)

( * ) Notice: Subject to any disclaimer, the term of this patent is extended or adjusted under 35 U.S.C. 154(b) by 139 days.

(21) Appl. No.: 13/318,254

(22) PCT Filed: Apr. 26, 2010

(86) PCT No.: PCT/EP2010/055503
§ 371 (c)(1),
(2), (4) Date: Dec. 1, 2011

(87) PCT Pub. No.: WO2010/125012
PCT Pub. Date: Nov. 4, 2010

(65) Prior Publication Data
US 2012/0070671 A1 Mar. 22, 2012

(30) Foreign Application Priority Data
Apr. 30, 2009 (EP) .................................... 09159168

(51) Int. Cl.
*B32B 27/12* (2006.01)
*B32B 27/40* (2006.01)
*C09J 175/04* (2006.01)

(52) U.S. Cl.
USPC ..................... 428/425.1; 428/308.8; 428/428; 428/309.9; 428/311.71; 428/317.5; 428/317.7; 156/331.7

(58) Field of Classification Search
USPC ........ 428/309.9, 311.71, 317.5, 317.7, 425.1, 428/308.8; 156/331.7
See application file for complete search history.

(56) References Cited

U.S. PATENT DOCUMENTS

| 4,882,408 A | 11/1989 | Blum |
| 5,955,023 A * | 9/1999 | Ioffe et al. ..................... 264/463 |
| 2003/0108760 A1 * | 6/2003 | Haas et al. .................. 428/537.1 |
| 2007/0088103 A1 | 4/2007 | Poncet |
| 2007/0155859 A1 * | 7/2007 | Song et al. ..................... 523/218 |
| 2009/0264560 A1 * | 10/2009 | Warnes et al. .................. 524/13 |

FOREIGN PATENT DOCUMENTS

| DD | 1564 80 | 9/1982 |
| DD | 211 689 | 7/1984 |

(Continued)

OTHER PUBLICATIONS

U.S. Appl. No. 13/410,616, filed Mar. 2, 2012, Schuette, et al.

(Continued)

*Primary Examiner* — Thao T. Tran
(74) *Attorney, Agent, or Firm* — Oblon, Spivak, McClelland, Maier & Neustadt, L.L.P.

(57) ABSTRACT

The invention relates to the use of a composite material having two or more superimposed layers of wood as a support element in structural engineering, nautical, vehicle and aircraft constructions, energy production systems, mining or in the production of furniture. The wood layers are joined together by means of a one component polyurethane adhesive containing a prepolymer with free NCO groups and the wood has a structure having a volume fraction of libriform fibers of between 50%-70%.

20 Claims, 4 Drawing Sheets

(56) References Cited

FOREIGN PATENT DOCUMENTS

Figure 1:
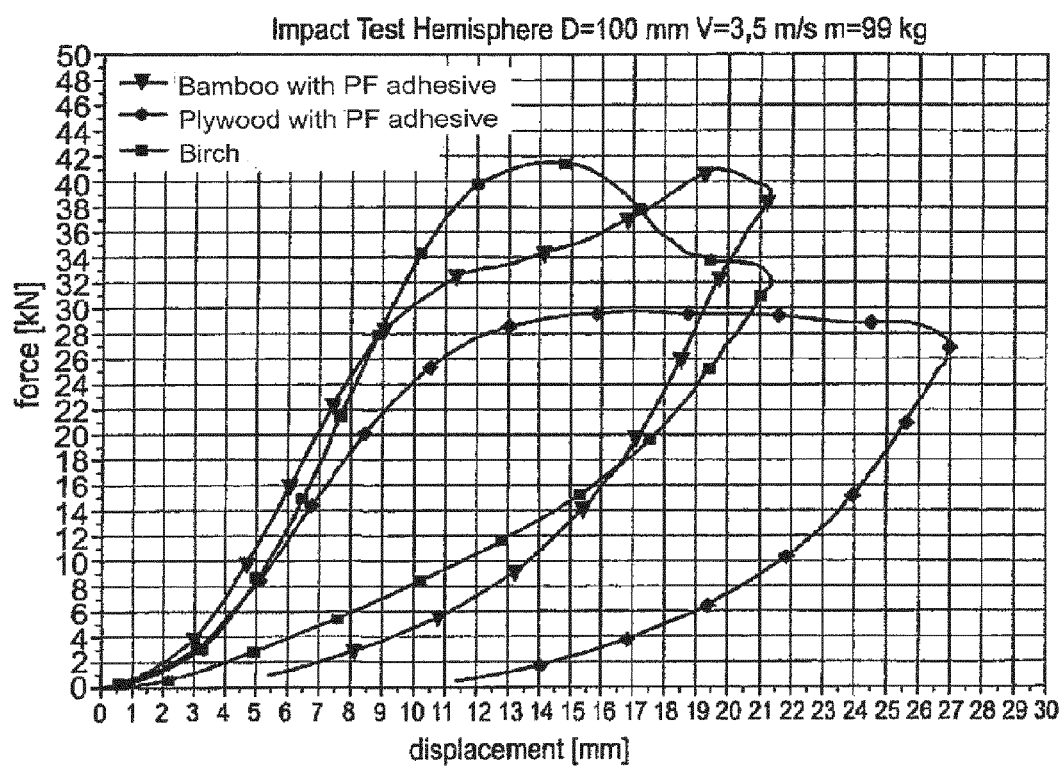

| | | |
|---|---|---|
| DD | 211 930 | 7/1984 |
| DD | 211 931 | 7/1984 |
| DE | 197 48 569 A1 | 5/1999 |
| EP | 0 300 388 A2 | 1/1989 |
| WO | WO 99/19141 | 4/1999 |

OTHER PUBLICATIONS

Search Report issued Jul. 2, 2010 in International Application No. PCT/EP2010/055503.

L.P. Futo, "Elektronenmikroskopische Direktabbildung von Leimfungen und Oberflächenbeschichtungen der Holzwerkstoffe", ETH Zurich, in: Holz als Roh- und Werkstoff 31, 1973, pp. 52-61 (With English Abstract).

Institute of International Container Lessors (IILC), "Preferred Standards for Hardwood Plywood Floor Panels", Technical Bulletin (TB) 001, Sep. 1, 2002, Short Span Test, 24 pages.

H. G. Völkel, et al., "Mikroskopie von Fasern, Füllstoffen und Papieren", Papiertechnische Stiftung, PTS-Manuskript PTS-MS 11/94-6, 1994, 30 pages.

Becker, et al., "Polyurethane", Kunststoff Handbuch 7, 1993, 25 pages.

\* cited by examiner

USE OF A COMPOSITE MATERIAL BASED ON A ONE COMPONENT POLYURETHANE ADHESIVE

The invention relates to the use of a composite material comprising two or more layers of a wood-like material which are arranged one on top of the other.

Composite materials have a very wide range of fields of use.

For sustainable use of resources, composite materials from renewable raw materials are particularly attractive. At present, about 800,000 m³ of tropical hard woods (in particular apitong, etc.) are used annually just for container floors, which corresponds to an area of about 560 km² (=about 3 times the area of Washington D.C.) of tropical rainforest, which are cleared for this purpose every year. Corresponding restrictions and quota fixing are already greatly limiting the availability of these timbers from tropical rainforests, so that alternative materials are being intensively sought.

US 2007/0088103 discloses a composite material which has in particular two layers which are bonded with an unfoamed polyurethane binder based on a urethane-modified isocyanate. The layers of the composite material may be lignocellulosic layers, in particular cork, wood, grass or straw.

However, the document does not describe composite materials from renewable raw materials having a low density and high mechanical load capacity and resilience.

It is known that laminated materials can be produced from wood, the individual layers being bonded to one another with phenol-formaldehyde adhesives. It is furthermore known to the person skilled in the art that good impregnation/penetration of the woods with the adhesive is important for durable adhesive bonding of woods, incorporation of the adhesive in the wood cells being desired. L. P. Futo, "Elektronenmikroskopische Direktabbildung von Leimfugen und Oberflächenbeschichtungen der Holzwerkstoffe", ETH Zurich, in: Holz als Roh-und Werkstoff 31 (1973), pages 52-61, has demonstrated, for example, the incorporation of phenol-formaldehyde resins in beech wood veneers adhesively bonded therewith. However, the fact that laminated materials produced with phenol-formaldehyde adhesives and comprising wood have in some cases a relatively high density of from 0.75 to 1.0 kg/l, or even >1 kg/l is disadvantageous. Particularly disadvantageous, however, is the insufficient static efficiency and in particular their insufficient dynamic efficiency. This leads both to early failure due to fracture under static load (Institute of International Container Lessors (IILC), Technical Bulletin (TB) 001, Sep. 1, 2002, Short Span Test), and especially to delamination of the individual layers of laminated materials produced therefrom, which layers are adhesively bonded with phenol-formaldehyde and/or polyvinyl acetate. Such laminated materials adhesively bonded with phenol-formaldehyde also exhibit their insufficient performance particularly under elevated temperatures, for example at 80° C.

It was an object of the invention to provide the use of a composite material comprising two or more layers of a wood which are arranged one on top of the other, the layers being bonded to one another such that a composite material is produced which has considerably better static and dynamic properties than is possible with the conventional laminated materials adhesively bonded with phenol-formaldehyde.

The solution consists in the use of a composite material comprising two or more layers of a wood which are arranged one on top of the other, the layers being bonded to one another with a one-component polyurethane adhesive comprising a prepolymer having free NCO groups, and the wood having a structure with a proportion by volume of libriform fibers of 50% to 70%, as a structural element in building construction, civil engineering, shipbuilding, vehicle construction, aircraft construction, construction of power plants, mining or furniture construction.

Libriform fibers are elongated, more or less thick-walled, narrow-lumen, pointed and closed tubular cells which carry air or water.

According to Treiber (in H.-G. Volkel and J. Weigl: "Mikroskopie von Fasern, Füllstoffen and Papieren", Papiertechnische Stiftung, Munich, PTS-Manuskript PTS-MS 11/94-6 (1994)), birch and aspen have almost twice as high a proportion by volume of libriform fibers as beech (given a similar vessel or tracheae volumes) (cf. table 1).

TABLE 1

Proportion of libriform fibers or tracheae (in the case of coniferous woods) in percentage by volume for different wood species

| Wood species | Tracheae or libriform fibers |
|---|---|
| Spruce (*Picca abies*) | 95 |
| Pine (*Pinus silvestris*) | 93 |
| Aspen (*Populus tremuloides*) | 62 |
| Birch (*Betula verruscosa*) | 65 |
| Beech (*Fagus silvatica*) | 37 |

According to the invention, woods having a high proportion by volume of libriform fibers, in particular a proportion by volume of from 50 to 70% of libriform fibers are used. These libriform fibers (closed tubular cells) are at least predominantly closed loculi, and these are also retained after adhesive bonding with a one-component polyurethane adhesive without being penetrated by or filled with the adhesive, so that, in the finished composite material, they act as an integrated air pump or an integrated air cushion. It is assumed that the above relationships are responsible for the fact that a composite material having substantially improved static and dynamic properties is obtained.

These outstanding static and dynamic properties are utilized according to the invention by proposing the use of such a composite material as a structural element in building construction, civil engineering, shipbuilding, vehicle construction, aircraft construction, construction of power plants, mining or furniture construction.

The wood having closed loculi is particularly preferably birchwood.

Further preferred woods are aspen, eucalyptus, rubber tree, silk tree, cotton tree, acacia or poplar or hornbeam.

The composite material according to the invention preferably has from 5 to 31 layers arranged one on top of the other.

The wood is preferably used as veneer, i.e. as in general from 0.5 to 2 mm thin wood layers peeled from the trunk.

Advantageously, one or more plastics layers, in particular one or more polyurethane and/or polyurea layers, in particular as outer layer(s), can be provided in addition to the one or more layers of a wood.

It is also possible to surround the composite material on all sides with a plastics layer.

These additional plastics layers can in particular comprise further, organic and/or inorganic fillers, for example organic clays, quartz sand, corundum, glass or other minerals or fibers or fiber mats of all types.

Additionally, one or more layers formed from a glass fiber web, a natural fiber web, a glass fiber mat or a natural fiber mat may be provided in the composite material according to the invention.

According to the invention, the two or more layers of a wood having a proportion by volume of libriform fibers of 50 to 70% closed loculi, in particular birch, are bonded with a one-component polyurethane adhesive comprising a prepolymer having free NCO groups.

Preferably, the one-component polyurethane adhesive comprises the prepolymer having free NCO groups in a proportion of up to 99% by weight, the prepolymer being obtainable from at least one component A having a compound reactive toward isocyanates and at least one component B having an isocyanate, from 0.1 to 40% by weight, preferably from 0.1 to 30% by weight, of a filler which comprises at least one fiber and which comprises at least one nonfibrous filler substance in addition to the fiber, from 0 to 20% by weight of customary additives and assistants, from 0 to 20% by weight of an activator, the at least one fiber having a diameter in the range from 5 to 100 μm and a length in the range from 0.02 to 6 mm.

In a further preferred embodiment, a one-component polyurethane adhesive is used without addition of a filler comprising a fiber. In particular, the one-component polyurethane adhesive comprises the prepolymer in a proportion of up to 99.999% by weight, the prepolymer being obtainable from at least one component A having a compound reactive toward isocyanates and at least one component B having an isocyanate, the one-component polyurethane adhesive comprising from 0 to 20% by weight of customary additives and assistants and from 0.001 to 20% by weight of at least one activator selected from one or more of the following substances: 4-methylmorpholine, 4-ethylmorpholine, 4-cyclohexylmorpholine, 2,2'-dimorpholinodiethyl ether and dimorpholinopolyethylene glycol, a) the prepolymer has the following features:
   i) an NCO content of from 5 to 30% by weight, based on the prepolymer
   ii) a viscosity at 25° C. in the range from 300 to 15,000 mPa·s, and
b) the component A has the following features:
   i) the component A comprises at least one diol
   ii) the OH number of the component A is in the range from 10 to 500 KOH/g, the one-component polyurethane adhesive comprising a filler and having a viscosity at 25° C. in the range from 300 to 15,000 mPa·s.

The above preferred one-component polyurethane adhesives are described in EP 1 072 620 and EP 1 072 621.

In the preparation of the prepolymer of the one-component polyurethane adhesive, the components A and B are preferably used in a ratio such that the above-described properties of the prepolymer, in particular the NCO content and the viscosity, are achieved. In addition, assistants and additives or catalysts can be used for the preparation of the prepolymer.

The further starting materials or components for the preparation of the prepolymer composition and adhesive composition are described by way of example below:

Expediently used compounds reactive toward isocyanates, namely component A, may be those having a functionality of from 2 to 8, preferably from 2 to 6, and a molecular weight of from 60 to 10,000, which have hydroxyl, thiol and/or primary and/or secondary amino groups as groups reactive toward isocyanates. For example, polyols selected from the group consisting of the polyetherols and polyesterols, polythioetherpolyols and polyacetals containing hydroxyl groups and aliphatic polycarbonates containing hydroxyl groups, polycarbonatediols and polycaprolactonediols and mixtures of at least two of said polyols have proven useful. Polyesterols and/or polyetherols are preferably used. The hydroxyl number of the polyhydroxy compounds is as a rule from 20 to 850 mg KOH/g and preferably from 25 to 500 mg KOH/g.

As compounds reactive toward isocyanates, it is also possible to use diols and/or triols having molecular weights of from 60 to <400 as chain extenders and/or crosslinking agents in the process according to the invention. For modifying the mechanical properties, for example the hardness, and for increasing the stability of the prepolymer, however, the addition of chain extenders, crosslinking agents or optionally also mixtures thereof may prove to be advantageous. The chain extenders and/or crosslinking agents preferably have a molecular weight of from 60 to 300 g/mol. For example, aliphatic, cycloaliphatic and/or araliphatic diols having 2 to 14, preferably 4 to 10, carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl) hydroquinone, triols, such as 1,2,4-, and 1,3,5-trihydroxycyclohexane, glycerol and trimethylolpropane, and low molecular weight polyalkylene oxides containing hydroxyl groups and based on ethylene oxide and/or 1,2-propylene oxide and the abovementioned diols and/or triols are suitable as starter molecules.

As polyol components, it is also possible in general to use highly functional polyols, in particular polyetherols based on highly functional alcohols, sugar alcohols and/or saccharides as starter molecules. Preferably, however, difunctional and/or trifunctional polyetherols or polyesterols based on glycerol and/or trimethylolpropane and/or glycols are used as starter molecules or as alcohols to be esterified. The preparation of the polyetherols is effected by a known technology. Suitable alkylene oxides for the preparation of the polyols are, for example, tetrahydrofuran, ethylene oxide, 1,3-propylene oxide, 1,2- or 2,3-butylene oxide, styrene oxide, preferably ethylene oxide and 1,2-propylene oxide. The alkylene oxides can be used individually, alternately in succession or as mixtures. Polyetherols particularly preferably used in the prepolymer in the adhesive composition according to the invention are those which were alkoxylated with ethylene oxide at the end of the alkoxylation and hence have primary hydroxyl groups.

Examples of suitable starter molecules are: water, glycols, such as ethylene glycol, propylene glycol, 1,4-butanediol and 1,6-hexanediol, amines, such as ethylenediamine, hexamethylenediamine, and 4,4'-diaminodiphenylmethane, and amino alcohols, such as ethanolamine or triethanolamine.

The polyetherols have a functionality of preferably from 2 to 6 and in particular from 2 to 3 and molecular weights of from 400 to 10,000, preferably from 1000 to 7000. The polyetherols can be used alone or as mixtures.

Polycarbonatediols are likewise suitable. Suitable polycarbonatediols are those comprising aromatic dihydroxy compounds, for example based on 4,4'-dihydroxydiphenyl-2,2-propane or those based on aliphatic dihydroxy compounds, e.g. 1,6-hexanediol. The molar masses range from 500 to 4000, preferably from 1000 to 2000.

Suitable polyesterols as the polyol component can be prepared, for example, from organic dicarboxylic acids having 2 to 12 carbon atoms, preferably aliphatic dicarboxylic acids having 4 to 6 carbon atoms, and polyhydric alcohols, preferably diols, having 2 to 12 carbon atoms, preferably 2 to 6 carbon atoms, or by polymerization of lactones having 3 to 20 carbon atoms. Dicarboxylic acids which may be used are, for example, glutaric acid, pimelic acid, suberic acid, sebacic acid, dodecanoic acid and preferably adipic acid, succinic acid and phthalic acid. The dicarboxylic acids can be used individually or as mixtures. For the preparation of the polyesterols, it may be advantageous to use the corresponding acid derivatives, such as carboxylic anhydrides or acyl chlorides, instead of the dicarboxylic acids. Suitable aromatic dicarboxylic acids are terephthalic acid, isophthalic acid or mixtures of these with other dicarboxylic acids, e.g. diphenic acid, sebacic acids, succinic acid and adipic acid. Examples of suitable glycols are diethylene glycol, 1,5-pentanediol, 1,10-decanediol and 2,2,4-trimenthylpentane-1,5-diol. 1,2-Ethanediol, 1,4-butanediol, 1,6-hexanediol and 2,2-dimethylpropane-1,3-diol; 1,4-dimethylolcyclohexane; 1,4-diethanolcyclohexane, ethoxylated/propoxylated products of 2,2-bis(4-hydroxy-phenylene)propane (bisphenol A) are preferably used. Depending on the desired properties of the polyurethanes, the polyols can be used alone or as a mixture in different ratios. Suitable lactones for the preparation of the polyesterols are, for example, $\alpha,\alpha$-dimethyl-$\beta$-propiolactone, $\gamma$-butyrolactone and preferably $\epsilon$-caprolactone. The polyesterols preferably have a functionality of from 2 to 4, in particular from 2 to 3, and a molecular weight of from 1200 to 3000, preferably from 1500 to 3000 and in particular from 1500 to 2500.

In particular, polyol mixtures have proven useful for the prepolymer. Such polyol mixtures preferably have at least one diol, preferably polypropylene glycol, and at least one triol, preferably polyethertriol. Particularly suitable diols have an average molecular weight in the range from 500 to 3000, preferably from 700 to 1500 and particularly preferably from 800 to 1500 and over and above this preferably from 800 to 1200. Triols having an average molecular weight of from 1000 to 8000, preferably from 2000 to 6000 and particularly preferably from 3000 to 5000 have proven useful as the triol. It is particularly preferable if the polyol mixture has an OH number in the range from 30 to 140, preferably from 50 to 90 and particularly preferably from 60 to 80 mg KOH/g. The abovementioned diols and triols can be used not only as a polyol mixture but also in each case by themselves for the preparation of the prepolymer.

In another embodiment of the prepolymer, the use of a polyetherpolyol which preferably has primary hydroxyl groups, having an OH number in the range from 10 to 200, preferably from 20 to 150 and particularly preferably from 25 to 100 mg KOH/g, has proven suitable.

If chain extenders, crosslinking agents or mixtures thereof are used for the preparation of the prepolymers, these are expediently used in an amount of from 0 to 20% by weight, preferably from 0.5 to 5% by weight, based on the weight of the compounds used altogether which are reactive toward isocyanates.

Suitable isocyanates or polyisocyanates of component B are the aliphatic, cycloaliphatic, araliphatic and/or aromatic isocyanates known per se, preferably diisocyanates, which, if required, may have been biuretized and/or isocyanurated by generally known methods. The following may be mentioned specifically by way of example: alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate, lysine ester diisocyanates (LDI), hexamethylene 1,6-diisocyanate (HDI), cyclohexane 1,3- and/or 1,4-diisocyanate, hexahydrotoluene 2,4- and 2,6-diisocyanate and the corresponding isomer mixtures, dicyclohexylmethane 4,4'-, 2,2'- and 2,4'-diisocyanate and the corresponding isomer mixtures, 1-isocyanato-3,3,5-trimethyl-5-isocyanatomethylcyclohexane (IPDI), toluene 2,4- and/or 2,6-diisocyanate, diphenylmethane 4,4'-, 2,4' and/or 2,2'-diisocyanate (monomeric MDI), polyphenylpolymethylene polyisocyanates (polymer MDI), and also naphthylene 1,5-diisocyanate (1,5-NDI) and tolylene diisocyanate (TODI=2,7-dimethyldiphenyl 1,6-diisocyanate) and paraphenylene diisocanate (PPDI) and/or mixtures comprising at least two of said isocyanates. Di- and/or polyisocyanates comprising ester, urea, allophanate, carbodiimide, uretdione and/or urethane groups may also be used in the process according to the invention.

MDI, such as polymer MDI or preferably monomer MDI, in particular 4,4'-MDI, or mixtures of 2,4'-MDI and 4,4'-MDI, are particularly preferred for the preparation of the prepolymer of the adhesive composition.

In one embodiment, it has proven particularly suitable to use a polymer MDI having an average functionality in the range from 1 to 5, preferably from 1.5 to 4 and particularly preferably from 2 to 3.5 and a viscosity in the range from 100 to 400, preferably from 150 to 300 and particularly preferably from 160 to 260 mPa·s for the prepolymer.

Catalysts which may be used are generally known compounds which greatly accelerate the reaction of isocyanates with the compounds reactive toward isocyanates, a total catalyst content of from 0.01 to 8% by weight, in particular from 0.1 to 5% by weight, based on the weight of the compounds used altogether which are reactive toward isocyanates, being preferably used. For example, the following compounds may be used: triethylamine, tributylamine, dimethylbenzylamine, dicyclohexylmethylamine, dimethylcyclohexylamine, N,N,N',N'-tetramethyldiaminodiethyl ether, bis-(dimethylaminopropyl)urea, N-methyl- or N-ethylmorpholine, N,N'-dimorpholinodiethyl ether (DMDEE), N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazole, N-hydroxypropylimidazole, 1-azabicyclo[2.2.0]octane, 1,4-diazabicyclo[2.2.2]octane (Dabco) and alkanolamine compounds, such as triethanolamine, triisopropanolamine, N-methyl- and N-ethyldiethanolamine, dimethylaminoethanol, 2-(N,N-dimethylaminoethoxy)ethanol, N,N',N-tris(dialkylaminoalkyl)hexahydrotriazines, e.g. N,N',N-tris(dimethylaminopropyl)-s-hexahydrotriazine, iron(II) chloride, zinc chloride, lead octanoate and preferably tin salts, such as tin dioctanoate, tin diethylhexanoate, dibutyltin dilaurate and/or dibutyldilauryltin mercaptide, 2,3-dimethyl-3,4,5,6-tetrahydropyrimidine, tetraalkylammonium hydroxides, such as tetramethylammonium hydroxide, alkali metal hydroxides, such as sodium hydroxide, alkali metal alcoholates, such as sodium methylate and potassium isopropylate, and/or alkali metal salts of long-chain fatty acids having 10 to 20 carbon atoms and optionally OH side groups. Trimerization catalysts, such as alkali metal or alkaline earth metal acetates, preferably potassium acetate, may furthermore be mentioned. The above catalysts can also be used as an activator in addition to the morpholine derivatives used as activators. Thus, catalysts are incorporated into the prepolymer as such in the preparation thereof and activators with the prepolymer as an additional constituent of the adhesive composition according to the invention are incorporated into said composition. Furthermore, Ti compounds, in particular Ti(IV)-O-alkyl compounds, having alkyl groups such as methyl, ethyl, n-propyl, isopropyl, n-butyl, isobutyl, tert-butyl, n-penty, 2-pentyl, 3-pentyl, preferably ethyl, n-propyl, isopropyl, n-butyl, isobutyl, tert-butyl, and particularly preferably Ti(IV) butylate have furthermore proven useful as catalysts or activators.

If appropriate, further assistants and/or additives may also be added to the reaction mixture for the preparation of the prepolymers. Surface-active substances, stabilizers, cell regulators, dyes, pigments, flameproofing agents, hydrolysis stabilizers, insecticides, fungistatic or bacteriostatic substances may be mentioned by way of example. The surface-active substances and stabilizers counteract "skin formation" of that surface of the adhesive composition which faces the air. Furthermore, the surface-active substances and stabilizers improve the leveling of the adhesive composition and the creepability of the adhesive composition and the devolatilization thereof. Suitable surface-active substances are, for example, compounds which serve for promoting the homogenization of the starting materials. Emulsifiers, such as the sodium salts of castor oil sulfates or of fatty acids or salts of fatty acids with amines, for example of diethylamine with oleic acid, of diethanolamine with stearic acid, and of diethanolamine with ricinoleic acid, salts of sulfonic acids, for example alkali metal or ammonium salts of dodecylbenzene- or dinaphthylmethanedisulfonic acid and ricinoleic acid; stabilizers, such as siloxane-oxyalkylene copolymers and other organopolysiloxanes, oxyethylated alkylphenols, oxyethylated fatty alcohols, liquid paraffins, castor oil esters or ricinoleic acid esters, Turkey red oil and peanut oil, and cell regulators, such as paraffins, fatty alcohols and dimethylpolysiloxanes, may be mentioned by way of example. The above-described oligomeric acrylates having polyoxyalkylene and fluoroalkane radicals as side groups are furthermore suitable for improving the emulsifying effect, the cell structure and/or stabilization of the prepolymer. If foam formation is to be reduced or avoided, trialkyl phosphates are preferred as antifoams. These preferably have alkyl groups, such as methyl, ethyl, n-propyl, isopropyl, n-butyl, isobutyl, tert-butyl, n-pentyl, 2-pentyl, 3-pentyl, preferably ethyl, n-propyl, isopropyl, n-butyl, isobutyl, tert-butyl. The surface-active substances are usually used in amounts of from 0.01 to 5% by weight, based on 100% by weight of the compounds used altogether which are reactive toward isocyanates.

Suitable flameproofing agents are, for example, tricresyl phosphate, tris(2-chloroethyl)phosphate, tris(2-chloropropyl)phosphate, tris(1,3-dichloropropyl)phosphate, tris(2,3-dibromopropyl)phosphate, tetrakis(2-chloroethyl)ethylene diphosphate, dimethylmethane phosphonate, diethyl diethanolaminomethylphosphonate and commercially available halogen-containing flameproofing polyols. In addition to the abovementioned halogen-substituted phosphates, it is also possible to use inorganic or organic flameproofing agents, such as red phosphorus, hydrated aluminum oxide, antimony trioxide, arsenic oxide, ammonium polyphosphate and calcium sulfate, expanded graphite or cyanuric acid derivatives, such as, for example, melamine, or mixtures of at least two flameproofing agents, such as, for example, ammonium polyphosphates and melamine and, if appropriate, corn starch or ammonium polyphosphate, melamine and expanded graphite and/or, if appropriate, aromatic polyesters, for increasing the flame resistance of the prepolymer or adhesive composition. In general, it has proven expedient to use from 5 to 50% by weight, preferably from 5 to 25% by weight, of said flameproofing agents, based on the weight of the compounds used altogether which are reactive toward isocyanates.

In a further preferred embodiment, a one-component polyurethane adhesive which has a filler comprising at least one fiber is used.

The one-component polyurethane adhesive preferably has at least one of the following main features (i) to (iii):
(i) the prepolymer has at least one of the following subfeatures (a) and (b):
   (a) an NCO content of from 5 to 30% by weight, based on the prepolymer,
   (b) a viscosity at 25° C. in the range from 300 to 150,000 mPa·s,
(ii) the component A has at least one of the following subfeatures (c) and (d):
   (c) the component A comprises at least one diol or polyol, preferably one diol or triol and particularly preferably a diol and triol,
   (d) the OH number of the component A is in the range from 10 to 500 mg KOH/g,
(iii) the filler has at least one of the following subfeatures (e) and (f):
   (e) the fiber consists at least one of fiber polymer,
   (f) the filler consists, in addition to the fiber, of at least one nonfibrous filler substance.

The viscosity at 25° C. of the prepolymer is preferably in a range from 300 to 15,000, preferably from 500 to 10,000 mPa·s if the adhesive composition is to be pumpable. If on the other hand it is intended to use the adhesive composition as a pasty, trowelable material, the viscosity at 25° C. of the prepolymer is preferably in the range from >15,000 to 150,000 and particularly preferably in the range from 20,000 to 100,000 mPa·s.

Furthermore, it is preferable if the adhesive composition has a low solvent content. This is the case when the amount of solvent present in the adhesive composition is <10, preferably <5 and particularly preferably <2% by weight. According to the invention, solvents are organic and inorganic liquids which are suitable as a vehicle for the other constituents of the adhesive composition and do not harden with at least a part of the other constituents.

Preferably, the adhesive composition is solvent-free.

In an advantageous embodiment of the adhesive composition, both the abovementioned main feature of the prepolymer (i) and the main feature (ii) of the component A are realized.

In another embodiment of the adhesive composition, the main feature (ii) of the component A and the main feature of the filler (iii) are fulfilled.

In another embodiment of the adhesive composition, all three main features (i) to (iii) are fulfilled.

Preferred embodiments of the adhesive composition are those in which in each case both subfeatures (a) and (b) or (c) and (d) or (e) and (f) are fulfilled in the case of the prepolymer, of component A and of the filler.

In another preferred embodiment of the adhesive composition, both all main features (i) to (iii) and all subfeatures (a) to (f) are fulfilled.

In a further embodiment of the adhesive composition, at least one of the features (iv) and (v) is fulfilled in addition to the features (i) to (iii):
   (iv) the fiber polymer is at least one polyamide,
   (v) the filler substance consists of at least one inorganic material.

It is preferable if the fiber polymers of the adhesive composition are formed predominantly from organic or inorganic materials. Suitable organic materials for fiber polymers are in particular polycondensates and polyaddition polymers which are preferably not polyurethane, polycondensates being preferred. Particularly suitable polycondensates are polycarbonates, polyesters, polyamides, polyimides and melamine-formaldehyde resin.

Polyaddition polymers are in particular polyacrylates, polymethacrylates, polystyrenes, polyacrylonitriles, polyethylene, polypropylene, polyvinyl alcohol and the copolymers of at least two monomers of the abovementioned homopolymers and blends of at least two thereof.

It is particularly preferable if a polyamide is used as the fiber polymer in the adhesive composition. All commercially available polyamides known to the person skilled in the art are suitable for this purpose. However, polyamides such as nylon, in particular nylon-6,6 or nylon-6, and polyaramides have proven particularly useful.

Furthermore, the fibers may be based on or consist of natural organic fiber polymers, for example cellulose, cotton, jute, viscose and sisal. In addition, the fibers may also be formed from inorganic materials. Preferred inorganic fiber polymers are carbon, glass and mineral wool fibers. Furthermore, it is possible for the fibers to be obtained from different materials, for example by spinning.

The fibers used preferably have a diameter in the range from 5 to 100, preferably from 10 to 60 and particularly preferably from 10 to 30 µm and a length in the range from 0.02 to 6, preferably from 0.05 to 4 and particularly preferably from 0.1 to 2 mm.

In addition, the adhesive composition has a nonfibrous filler substance which consists of at least one inorganic material. In principle, all inorganic materials known to the person skilled in the art and in particular the commercially available inorganic materials, which are present as a solid, are suitable for the adhesive according to the invention. The inorganic materials must be present as a solid in particular in the temperature range in which the adhesive composition according to the invention is processed and the adhesively bonded article is subsequently used. This temperature range preferably begins at −50 and extends up to +160° C.

The oxygen compounds of silicon or of aluminum or of magnesium or at least two thereof, which moreover optionally have further elements, have proven to be particularly suitable inorganic materials. Silicates and aluminum oxides, for example clays, such as china clay, and quartz compounds or silicic acid are particularly suitable.

The nonfibrous filler substances are preferably particulate. 80% of the particulate filler substances have a particle size in the range from 0.01 to 50, preferably from 0.1 to 10 and particularly preferably from 0.2 to 8 µm.

The filler used according to the invention may comprise fibers or additionally filler substances. If the filler has both fibers and filler substances, it is preferable if at least just as much filler substances as fibers, preferably filler substances in excess, are present in the filler.

Fillers are present in the adhesive composition in particular to improve the physical properties thereof for the various uses. For this purpose, the adhesive composition must form a bubble-free adhesive layer which is as compact as possible after curing and the joints between the substrates must be filled as completely as possible. In order to increase the adhesion, the adhesive composition should partly penetrate into the substrate surface. However, after curing of the adhesive composition to give the adhesive, this penetration or shrinkage should not result in any cavities which might adversely affect the cohesion. Particularly in thicker joints, in the range of from greater than 0.1 to 1 mm, preferably from 0.2 to 1 mm, these requirements can be particularly readily met by incorporating fillers in the composition described above into the adhesive composition.

In the case of the fillers present in the adhesive compositions, it has proven particularly useful if they have a water content of less than 5, preferably less than 1 and particularly preferably less than 0.1% by weight, based on the filler. This is advantageous in particular with regard to the preparation of the adhesive composition according to the invention.

The activator of the adhesive composition consists at least of one morpholine derivative. Particularly suitable morpholine derivatives are 4-methylmorpholine, 4-ethylmorpholine, 4-cyclohexylmorpholine, 2,2'-dimorpholinodiethyl ether or dimorpholinopolyethylene glycol, or at least two thereof. Furthermore, further compounds having an activating effect, as described, for example, as polyurethane catalysts in Becker/Braun, Kunststoffhandbuch 7 (1993), can be used in addition to the morpholine derivatives, the proportion of the morpholine derivatives preferably predominating.

Thixotropic assistants have proven advantageous, in particular with regard to the shelf-life. Particularly preferred thixotropic assistants are bentonites, kaolins, alginic acid and silicic acid, the silicic acid being particularly preferred. In addition to or instead of the abovementioned thixotropic assistants consisting of solids, soluble thixotropic assistants which can be obtained, for example, via the reaction of an isocyanate in the presence of amines, as described in the publications EP 300 388 A1, DD 156 480, DD 211 689, DD 211 930 and DD 211 931, are preferred.

Thixotropic assistants are small-particled substances which thicken liquids even when they are added and release small amounts to the liquid, for example up to not more than 10% by weight, based on the liquid. These small particles preferably have on their surface silano groups which interact with the liquid with which they are dispersed, with formation of hydrogen bridge bonds, and thus lead to thickening of this liquid. Typical of thixotropic assistants is that, with the same amount, the thickening effect increases with decreasing particle size on appropriately careful dispersing by vigorous mixing. Furthermore, the thixotropic assistants have the advantage that they do not settle out in the dispersed liquid. Moreover, the thixotropic assistants prevent or delay the settling out of fillers. Preferred materials for thixotropic assistants are montmorillonite, Mg/Al silicate, Al/Na silicate, bentonites, hectorite, Na/Mg silicate, pyrogenic silicas, hydrated silicas, hornblende-chrysotile, chrysotile-asbestos, chrysotile-silicic acid and precipitated MgO in fine powder form, pyrogenic silicas, for example obtainable as Aerosil from Degussa-Hüls AG, and magnesium silicates, obtainable as Bentone from Kronos Titan GmbH Leverkusen, being preferred and Aerosil being particularly preferred.

The invention relates to the use of a composite material comprising two or more layers of a wood which are arranged one on top of the other, the layers being bonded to one another with a one-component polyurethane adhesive comprising a prepolymer having free NCO groups, and the wood having a structure with closed loculi, as a structural element in building construction, civil engineering, shipbuilding, vehicle construction, aircraft construction, construction of power plants, mining or furniture construction.

The composite material used according to the invention is also characterized in particular by elastic reversible energy absorption; it has an energy-dissipitating effect. This gives rise to a variety of potential uses, in particular in areas where high energy absorption is required, for example for bulletproof elements, or in environments where there is a risk of explosion, for example in mining or in chemical plants.

The composite material can preferably be used as a load-bearing element, in particular as a floor, intermediate floor, wall or roof element. The composite material can furthermore be used as a support element and/or formwork element.

The use of a composite material described above as a container bottom or trailer bottom is particularly preferred.

The use as a structural element in trucks, buses, trailers, aircraft, railways, ships or ferries is preferred.

The composite material according to the invention is also particularly suitable for strengthening air turbine blades or other components of power plants.

Use in building construction and civil engineering, for formwork for concrete and other structures where good load-bearing capacities and in particular good separation effects from other building materials, in particular plastics or concrete, are important is also particularly preferred.

Further preference is given to the use as a bulletproof element.

The invention also relates to a container bottom or trailer bottom formed from a composite material described above. Particular preference is given to a container bottom or trailer bottom formed from a composite material described above, the wood used being birchwood.

Although relationships have not been completely clarified, it is assumed that, by the combination, according to the invention, of a wood with closed loculi, in particular birch, with a one-component polyurethane adhesive comprising a prepolymer having free NCO groups, improved chemical binding of the adhesive to the matrix of the layers of the wood via the free NCO groups of the prepolymer is achieved in that these react with the free OH groups from the wood, in particular from starch or cellulose or lignin and constituents of silicic acid-containing derivatives, in particular in the outer layers, and also with the residue of moisture from the wood. Optical micrographs indicate that the one-component adhesive surprisingly does not penetrate into the wood fibers or vessels, so that these remain intact. The wood has a structure with substantially closed loculi which are also retained in the adhesively bonded composite material and are not penetrated by or filled with the adhesive.

Container bottoms and trailer bottoms must conform to certain required specifications: Dimensions of 2.40 m×1.16 m×28 mm (length×width×thickness) are customary. However, their use is not limited to these dimensions. In particular, the use of the composite material described here according to the invention is not limited to these dimensions or density ranges. The density should be 0.8±0.1 kg/l.

The standard IICL (Institute of International Container Lessors), TB (Technical Bulletin) 001, of Sep. 1, 2002, "Short Span Test" (250 mm "Span Shear Test") for the static bending strength in the three-point bending test standardizes a force to damage of at least 6900 N. The test procedure and the dimensions of the test specimen are described in detail in IICL TB 001. Here, not only failure due to fracture but in particular also delamination between the layers are rated as damage, which occurs in particular in the case of insufficient adhesive bonding. The tests are carried out under standard climatic conditions (23° C. and 55% relative humidity).

These requirements are met by the tropical wood apitong predominantly used at present: laminated materials (also referred to in general as "plywood") comprising apitong wood with phenol-formaldehyde as adhesive have a density of about 0.8 kg/l and a load limit of from about 7000 to 7300 N in the static three-point bending test at 23° C./55% relative humidity.

Since apitong, however, is no longer available in unlimited quantities, it is necessary to find alternatives which likewise meet the above required specifications or substantially surpass the performance level to date of the alternative laminated materials ("plywood") comprising other materials, such as, for example, bamboo.

The composite materials "plywoods" available on the market and comprising other materials predominantly do not meet the above requirements: composites comprising bamboo layers which are conventionally adhesively bonded with phenol-formaldehyde and also composite materials comprising other woods, such as beech, pine, spruce, etc., wood veneers or laminated materials ("plywoods") comprising mixtures of different wood veneers and also, for example, such mixtures with bamboo layers, which in each case are adhesively bonded with phenol-formaldehyde and/or polyvinyl acetate, do not meet the above-described requirements for use as container bottoms and the certification tests for container bottoms according to IICL TB 001. Such laminated materials have maximum forces to failure in the range of from 5400 to 6600 N, in each case at 23° C. and 55% relative humidity. Depending on structure and materials and adhesives used, these laminated materials even show densities up to 0.9 kg/l and in some cases even up to >1 kg/l.

On the other hand, the use of the proposed composite materials based on wood with closed loculi for the production of structural elements, particularly of load-bearing elements, in particular container bottoms is particularly suitable, since the above materials have the low density of not more than 0.8±0.1 kg/l required, for example, for container bottoms.

TABLE 2

Essential characteristic data of the various materials according to IICL TB 001 at 23° C./55% relative humidity

| Material | Density (kg/l) | Thickness (mm) | Max. force at failure (N) | Max. bending stress (MPa) | Modulus of elasticity (MPa) |
|---|---|---|---|---|---|
| Apitong (PF) | 0.8 | 27.8 | 7506 | 71.6 | 6562 |
| Plywood (PF) | 0.83 | 28.6 | 6282 | 66.5 | 5323 |
| Bamboo (PF) | 1.05 | 27.3 | 6558 | 64.8 | 5974 |
| Material for the use according to the invention as load-bearing element: birch (1-C PU) | 0.83 | 28.7 | 12801 | 112.3 | 7267 |

In the certification test for container bottoms according to IICL TB 001, the material comprising the tropical rainforest wood apitong, which is virtually no longer available, adhesively bonded with phenol-formaldehyde (PF) shows a maximum force of 7506 N and thus fulfills the specification. The substitute material plywood adhesively bonded with phenol-formaldehyde (PF), with a maximum force at failure at a level of 6282 N, fulfills the specification for container bottoms just as poorly as bamboo adhesively bonded with phenol-formaldehyde (PF) (max. force 6558 N).

The composite material according to the invention comprising birch and the one-component PU adhesive has a maximum force at failure of 12801 N in the certification test for container bottoms according to IICL TB 001 and is thus almost twice as high as required by the corresponding standard. In particular, the maximum force at failure for composite material comprising birch and 1-C PU adhesive for the use according to the invention, at 12801 N, is far above the values for bamboo and plywood adhesively bonded with phenyl-formaldehyde (6282 N and 6558, respectively) which do not meet the requirements of TB 001.

In the tests for determining the static efficiency of such materials for container bottoms, which tests are described here, the maximum bending stress (in MPa), which results from the prescribed sample geometry (according to IICL TB 001) and the maximum force at failure measured in the test, was furthermore determined from the measured test data. Said bending stress is 71.6 MPa for the tropical hardwoods apitong which is no longer available, 66.5 MPa for the substitute materials adhesively bonded with phenol-formaldehyde plywood and 64.8 MPa for bamboo. The composite material based on birch and 1-C PU adhesive on the other hand has a maximum bending stress of 112.3 MPa which is therefore likewise almost twice as great as that of the comparative materials. The bending stress is described in Dubbel, Taschenbuch für Maschinenbau.

The modulus of elasticity is generally known to the person skilled in the art as a characteristic typical of the material. For the materials described here, the flexural modulus of elasticity, as obtained from the measurements carried out here, is 6562 MPa for the tropical rainforest woods apitong, 5323 MPa for plywood and 5974 MPa for bamboo.

On the other hand, the flexural modulus of elasticity of the composite material, birch with 1-C PU is 7267 MPa and is therefore on the level of apitong and substantially higher than that of the comparative materials based on substitute woods with phenol-formaldehyde, which manifests itself in the substantially higher strength of the material according to the invention.

While the characteristics described above describe the mechanical-static performance level of the materials at 23° C./55% relative humidity, as also required in the critical specification for container bottoms (IICL TB 001), they say nothing, however, about the behavior at elevated temperatures which certainly occur in containers in the respective regions of the Earth.

The following measurements show that the high performance level at room temperature is also ensured at high temperatures. Table 3 shows the corresponding measurements according to IICL TB 001 at 80° C., although such measurements are not required or described in the specification.

TABLE 3

Essential characteristic data of the various materials according to IICL TB 001 at 80° C.

| Material | Density (kg/l) | Thickness (mm) | Max. force (N) | Max. bending stress (MPa) | Modulus of elasticity (MPa) |
|---|---|---|---|---|---|
| Apitong (PF) | 0.8 | 27.8 | 5887 | 67.1 | 5982 |
| Plywood (PF) | 0.8 | 28.6 | 5067 | 54.4 | 4665 |
| Bamboo (PF) | 1.05 | 27.3 | 4737 | 47.7 | 4580 |
| Material for the use according to the invention as load-bearing element: birch (1-C PU) | 0.83 | 28.7 | 9973 | 86.6 | 5855 |

For this purpose, the respective test specimens were stored at 80° C. until they had completely warmed through and were measured.

Even at greatly elevated temperature of 80° C., the composite material based on birch and the 1-C PU adhesive shows its substantial superiority in performance compared with apitong and the other plywood and bamboo laminate materials adhesively bonded with phenol-formaldehyde.

Thus, the maximum force of the composite material according to the invention, based on birch and the 1-C PU adhesive, at failure, at 9973 N at 80° C., is almost twice as high as that of the comparative materials and its maximum bending stress of 86.6 MPa is 30% above that of apitong and 80% above that of bamboo with phenol-formaldehyde.

In addition, the composite material selected for the use according to the invention also has excellent dynamic properties: for this purpose, the method of measurement was developed for determining the dynamic load limit. So-called Wöler curves were recorded in the dynamic step test. Wöhler curves are described, for example, in: Dubbel, Taschenbuch für Maschinenbau. For the Wöhler curves of the material according to the invention and the comparative examples, samples of the respective materials having a length of 30.5 cm, a width of 5 cm and a thickness of 28 mm, as described and used in the abovementioned IICL TB 001, were loaded periodically at a frequency of 10 Hz with a maximum bending stress and the load was reduced in each case to 10% of this maximum bending stress. (The designation in the diagram R=0.1 indicates the ratio of max./min. bending stress). The number of cycles completed without damage (fracture or delamination of the laminated material) thus provides information about the expected dynamic performance level or about the fatigue behavior of the respective material during its use as a container bottom. The larger the number of cycles completed without damage and the higher the maximum bending stress introduced there, the higher is the dynamic performance level of the material and therefore also the real lifetime of the respective container bottoms. The maximum bending stresses on failure from IICL TB 001, as summarized in Table 2 and Table 3, serve for determining the maximum bending stresses used in each case. Since this is the maximum bending stress at failure, i.e. the bending stress at which the respective material fails on loading once, correspondingly lower bending stresses are chosen for the Wöhler curves. An appropriately low bending stress of 20 MPa is used as a starting point and the sample is loaded therewith 5000 times at a frequency of 10 Hz. If the sample passes this test, the maximum bending stress is increased to 40 MPa and the same sample passes again through 5000 cycles at 10 Hz. If this test too is passed without damage, the maximum bending stress is increased successively and in each case stepwise by a further 20 MPa until failure occurs. Such Wbhler curves are carried out in this shortened dynamic step test, which is tougher compared with the normal Wöhler test, for comparative materials and for the composite material birch with 1-C PU adhesive and are shown in Table 4. The tests in Table 4 were carried out in each case under standard conditions of temperature and humidity, 23° C. and 55% relative humidity.

TABLE 4

Dynamic step testat 23° C./55% relative humidity

| Material | Max. bending stress (MPa) | Number of cycles |
|---|---|---|
| Plywood (PF) | 40 | 10400 |
| Bamboo (PF) | 60 | 18000 |
| Material for the use according to the invention as load-bearing element: birch (1-C PU) | 100 | 20800 |

The substantially higher dynamic performance level of the composite material based on birch with the one-component PU adhesive manifests itself clearly in the substantially higher maximum bending stress of 100 MPa and the 20,800 cycles passed through. In comparison with the composite material birch, the comparative materials comprising bamboo or plywood with phenol-formaldehyde are destroyed at only 60 MPa or even at 40 MPa and cumulatively 10,400 cycles.

The dynamic performance level of the composite material based on birch and 1-C PU adhesive thus surpasses that of the comparative materials by the factor of 2.5 and 1.66, respectively, in the maximum bending stress alone as dynamic load capacity, with additionally substantially higher load cycles passed through cumulatively.

Furthermore (Table 5), the substantially superior dynamic performance level of the composite material comprising birch and the 1-C PU adhesive is also determined at 80° C.

TABLE 5

Dynamic step test at 80° C.

| Material | Max. bending stress (MPa) | Number of cycles |
|---|---|---|
| Plywood (PF) | 40 | 7100 |
| Bamboo (PF) | 40 | 8700 |
| Material for the use according to the invention as load-bearing element: birch (1-C PU) | 80 | 20300 |

Here too, the substantially superior dynamic performance of the composite material based on birch and the 1-C PU adhesive is evident:

While the comparative materials comprising plywood or bamboo manage a maximum bending stress of just 40 MPa and 7100 or 8700 cycles, respectively, at 80° C., the composite material comprising birch and the 1-C PU adhesive passes through comfortably more than 20,000 cycles at a bending stress of 80 MPa. It should be pointed out that the maximum bending stress of 80 MPa which the composite material is capable of here without problems in the dynamic step test at 80° C. as a continuous load is not managed by any other comparative materials even at 23° C. as a maximum bending stress at failure on one-time loading (cf. Table 3).

The fact that the material for the use according to the invention has a substantially higher dynamic performance level is also evident in a greatly higher and reversibly elastic energy absorption in corresponding drop tests. Here, sheets of the respective materials measuring 32 cm×32 cm were screwed on a steel frame with 8 cm height at the four corner points using four M 8 screws, the spacing of the steel supports being 26 cm. The sheet had no further support/underlay, so that this test arrangement reflects the real installation situation in a container in a manner very true to reality. The sheets are then subjected to a drop test by allowing a cylindrical hemisphere of 99 kg weight to drop unbraked from a height of 0.624 m onto the unsupported test specimen. The energy introduced in the drop tests shown here is in each case 609 J, which corresponds under these conditions to an impingement velocity of 3.5 m/sec.

The invention is illustrated in more detail below with reference to a drawing.

Figure 2:
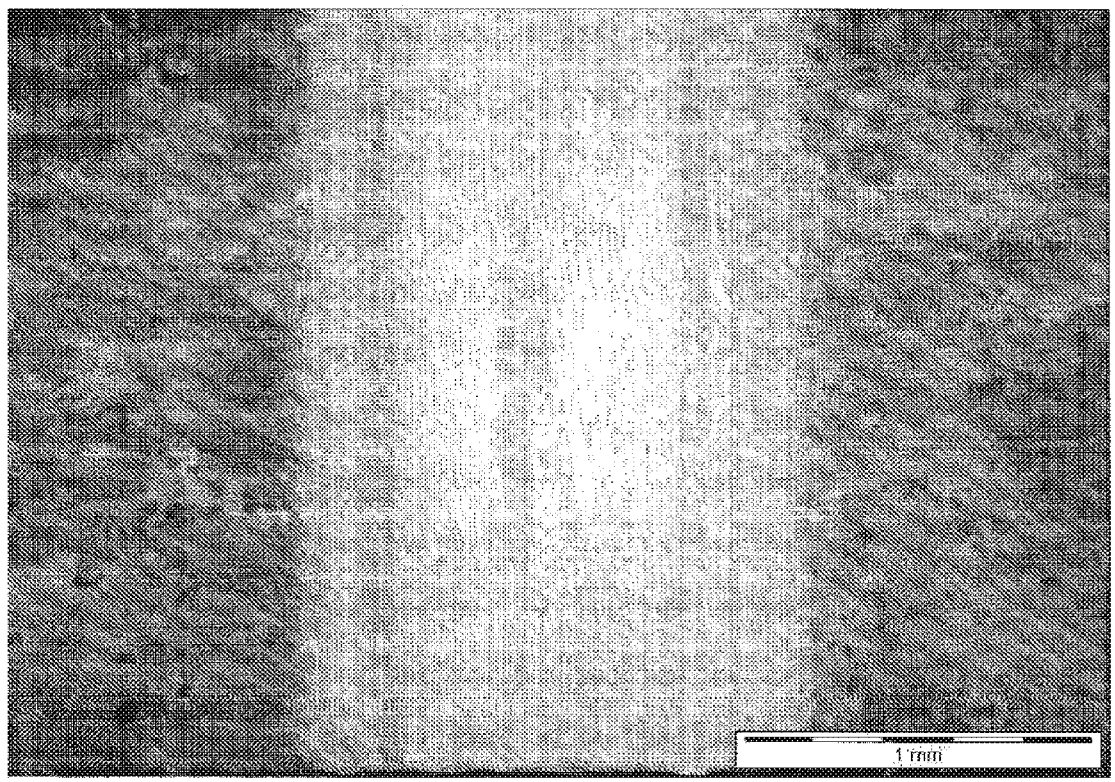
Figure 3:
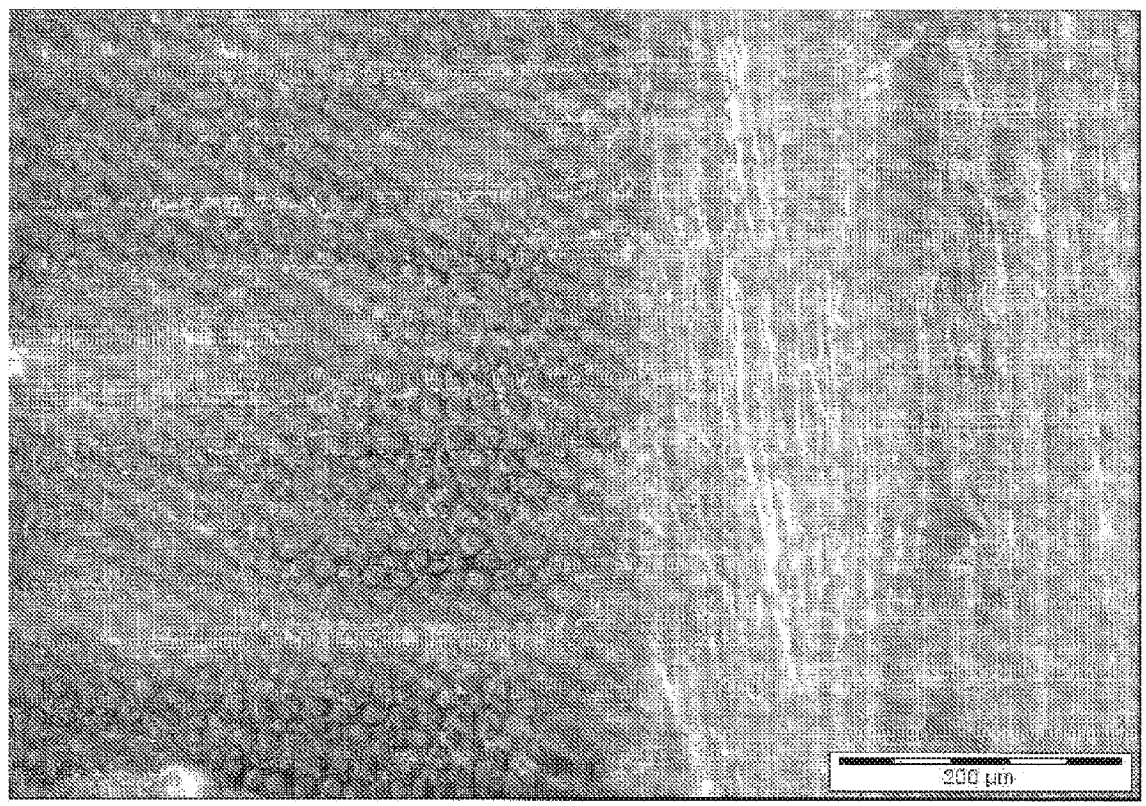
Figure 4:
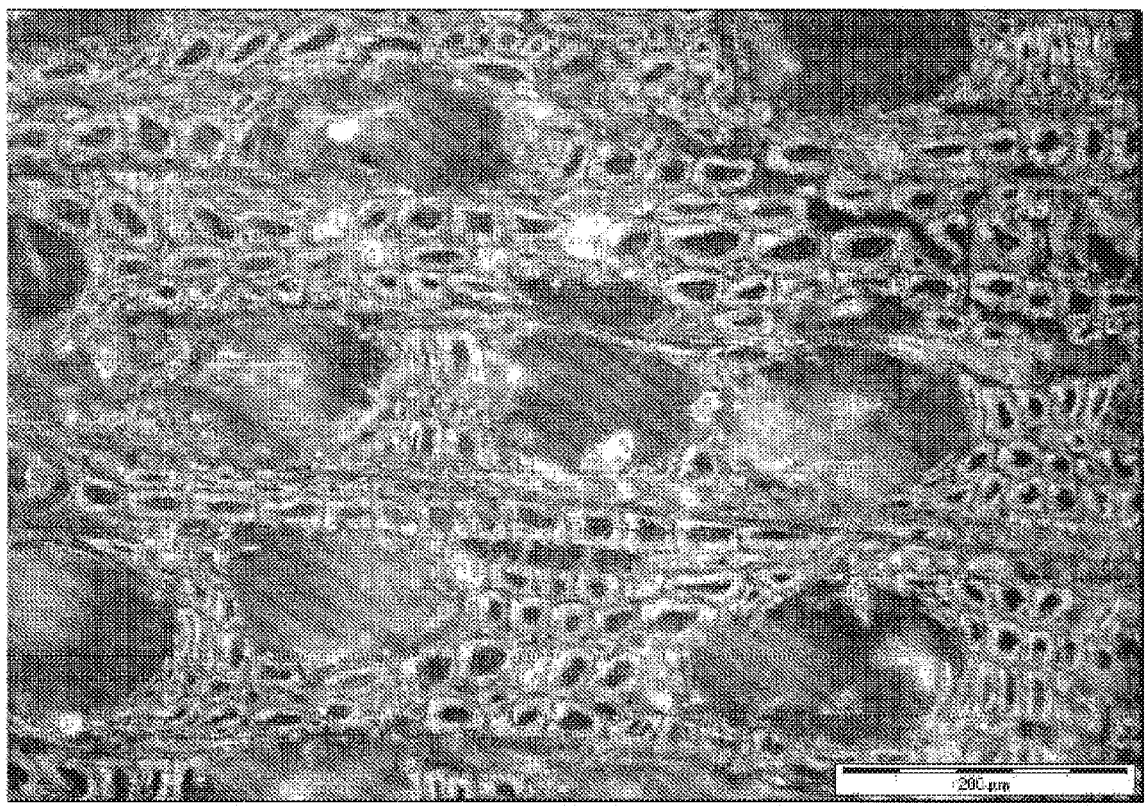

Specifically:

FIG. 1 shows the results of drop tests with a composite material for a use according to the invention, FIG. 2 shows an optical micrograph for a composite material for a use according to the invention, FIG. 3 shows an optical micrograph of the same composite material as in FIG. 2, but with higher resolution, and FIG. 4 shows an optical micrograph of apitong for comparison, as wood with open cell structure, i.e. a wood which does not have a proportion by volume of libriform fibers in the range from 50 to 70%.

FIG. 1 shows diagrams of drop tests with a hemisphere having a diameter of 100 mm and a weight of 99 kg, with a height of drop of 0.624 m. Thus, the amount of energy introduced was 609 J. In the figure, the deformation or permanent load compression characteristic V in mm is plotted along the abscissa and the force F in kN along the ordinate. The values for the composite material, birch bonded with a one-component polyurethane adhesive, are shown by circles, the values for a comparative material comprising bamboo with phenol-formaldehyde adhesive are shown by triangles and the values for a comparative material comprising plywood with phenol-formaldehyde adhesive are shown by rhombuses.

The board comprising the plywood composite material with PF adhesive (shown by rhombuses) was destroyed completely in the test, which corresponds to an irreversible energy absorption. The board showed a permanent deformation or a load compression characteristic of 12-13 mm, corresponding to 50%, based on the original board thickness.

The board comprising the composite material bamboo with phenol-formaldehyde adhesive (shown by triangles) was also destroyed in the test, which corresponds to an irreversible energy absorption. It showed a permanent deformation or a load compression characteristic of from 6 to 7 mm, corresponding to about 30% of the original board thickness.

The resistance of the board to the energy introduced in this test is expressed in the measured force as the response of the material.

This response force or the resistance to destruction is about 25 kN in the case of the plywood board with PF adhesive and from about 30 kN to not more than 35 kN in the case of the comparative material bamboo with phenol-formaldehyde.

Surprisingly, the board comprising the material, birch/1-C PU adhesive (shown by circles), remained completely intact and had no permanent load compression characteristic at all. The total energy absorption is reversible and is elastically dissipated without the test board suffering any damage. The maximum response force of about 50 kN is twice as high as that of plywood/phenol-formaldehyde or up to 66% higher than that of the comparative material bamboo/phenol-formaldehyde.

These tests therefore furthermore show the substantially higher dynamic performance level of the material according to the invention, birch/1-C PU, which is also demonstrated in particular by its destruction-free energy absorption, and which effectively backs up the discussed higher efficiency of load-bearing parts produced therewith, such as, in particular, container bottoms here.

FIG. 2 shows an optical micrograph of a composite material comprising birch and a 1-C PU adhesive. The micrograph shows the orthogonal layer structure and the fact that the libriform fibers are not saturated with adhesive.

FIG. 3 further illustrates the composite material shown in FIG. 2, by a higher resolution being chosen. The micrograph shows that the libriform fibers are substantially retained in two successive layers of birchwood arranged orthogonally to one another and are not penetrated by the adhesive.

FIG. 4 shows an optical micrograph of apitong and illustrates by way of example the open-cell structure of this wood.

The invention claimed is:

1. A method of constructing a structure, the method comprising:
incorporating into, or combining with, the structure a structural element comprising a composite material comprising two or more layers of a wood
wherein the layers of wood are arranged one on top of the other,
wherein the layers of wood are bonded to one another with a one-component polyurethane adhesive comprising a prepolymer having a free NCO group, and
wherein the wood has a structure with a proportion by volume of libriform fibers of 50% to 70%.

2. The method of claim 1, wherein the wood comprises closed loculi and is birchwood.

3. The method of claim 1, wherein the structural element is a floor, intermediate floor, wall, or roof element.

4. The method of claim 3, wherein the structural element is a container bottom or trailer bottom.

5. The method of claim 3, wherein the structural element is a trailer bottom.

6. The method of claim 1, wherein at least a portion of the structural element is bulletproof.

7. The method of claim 1, wherein the structure is a building, a civil engineering structure, a vehicle, an aircraft, a power plant, a mine, or furniture.

8. The method of claim 1, wherein the structure is a container bottom.

9. The method of claim 1, wherein the structure is a container bottom trailer bottom.

10. The method of claim 1, wherein the composite material comprises from 5 to 31 layers.

11. The method of claim 1, wherein the composite material further comprises a layer comprising a glass fiber web.

12. The method of claim 1, wherein the composite material further comprises a layer comprising a natural fiber web.

13. The method of claim 1, wherein the composite material further comprises a layer comprising a glass fiber mat.

14. The method of claim 1, wherein the composite material further comprises a layer comprising a natural fiber mat.

15. The method of claim 1, wherein the composite material further comprises a layer comprising plastic.

16. The method of claim 15, wherein the composite material further comprises a layer comprising:
   plastic; and
   at least one selected from the group consisting of an organic filler and an inorganic filler.

17. The method of claim 1, wherein the composite material further comprises a layer comprising polyurethane/polyurea.

18. The method of claim 1, wherein the composite material is surrounded on all sides with a plastic layer.

19. A container bottom or trailer bottom, formed by the method of claim 1.

20. The container bottom or trailer bottom of claim 19, wherein the composite material comprises birchwood.

* * * * *